United States Patent [19]
Durand

[11] Patent Number: 4,727,623
[45] Date of Patent: Mar. 1, 1988

[54] MACHINE FOR PULLING OFF STRIPS OF FAT FROM HOG CARCASSES

[75] Inventor: Lucien Durand, Baix, France

[73] Assignee: Societe Anonyme: Societe des Ateliers de Constructions Mecaniques: Lucien Durand, Baix, France

[21] Appl. No.: 42,270

[22] Filed: Apr. 24, 1987

[30] Foreign Application Priority Data

Apr. 28, 1986 [FR] France ............... 86 06360

[51] Int. Cl.$^4$ .................................... A22B 5/00
[52] U.S. Cl. ............................ 17/1 R; 17/21
[58] Field of Search ................. 17/1 R, 21, 50

[56] References Cited

U.S. PATENT DOCUMENTS 3,157,213 11/1964 Harris et al. .
4,189,806 2/1980 Van Heyningen .............. 17/50 X

FOREIGN PATENT DOCUMENTS

A-2428979 6/1979 France .

*Primary Examiner*—Willie G. Abercrombie
*Attorney, Agent, or Firm*—Bacon & Thomas

[57] ABSTRACT

The invention relates to a machine comprising:
a chassis movable with respect to a supporting structure,
a clamp comprising:
  two jaws,
  means for controlling the opening and closing of said jaws,
  passive counter-jaws operationally coupled to said jaws,
  and means for controlling said counter-jaws with respect to said jaws.

The invention finds an application in the mass-slaughtering of hogs.

19 Claims, 22 Drawing Figures

MACHINE FOR PULLING OFF STRIPS OF FAT FROM HOG CARCASSES

BACKGROUND OF THE INVENTION

The present invention relates to the mass-slaughtering of hogs and more particularly, to the operations of preparation that follow the slaughtering.

The invention further relates, to the more specific preparation step which consists, after slaughtering and evisceration, in pulling off or loosening the two layers or strips of fat lining the inside faces of the hog sides, these deposits of fat being normally called belly strips.

These belly strips can be considered as by-products which are not directly included in food consumption. Generally, these sub-products find an application in industry, and in particular, in the cosmetics industry.

The belly strips have that particular characteristic that their preserving is essentially dependent on the process used for pulling them off from the hog carcass. It has been found that these belly strips had to be pulled off, at least partly, immediately after evisceration and before cooling, so that they only need to be severed off in those parts where they are still attached to the sides of the hog, in order to obtain a strip of fat in the best conditions of preservation.

DESCRIPTION OF THE PRIOR ART

In a mass-slaughtering process, the pulling off operation has to be carried out when the hog carcass is still suspended by its hind legs, after evisceration, and preferably before the hog is cut.

Heretofore, said pulling off of the belly strips had been conducted manually in stationary or moving manner if the hog is moved by a continuously moving conveyor. The operator is required to introduce both hands inside the open and suspended hog carcass, in order to grip, by the finger tips, the lower base of a layer of fat for, first of all, pulling it off from the inner face of the hog side in question. A second step of the operation consists then in exerting an upward, really strong, and sustained force, to loosen the belly strip as far as the upper part, namely the part by which it is attached to the inside face of the hog's belly.

The operator, of course, has to repeat the above operation for the second belly strip in the hog.

The operation of pulling off and loosening the two belly strips in a hog represents a considerably hard work, given that the gripping of each belly strip with the tips of the fingers is made difficult by the fatty consistency of the strips, the wetness of the medium and the temperature inside the hog carcass.

Moreover, this work requires great physical efforts from the operator, both for the pulling off and loosening which necessitate from him a simultaneous movement of the two arms, causing generally excessive tiredness in the scapulohumeral articulations.

It is frequently found that people doing this work suffer from a relatively early degradation of the hands and in particular of the finger tips, from tendinitis, and even from chronic periarthritis, all of which represent serious handicaps.

The difficulty of this work has never really been underestimated but, until now no machines had been proposed capable of replacing the manual work and of performing in good conditions the pulling off and loosening of hog belly strips while following the varying slaughtering rate per hour of industrial installations worked to meet the demand.

OBJECT AND SUMMARY OF THE INVENTION

It is precisely the object of the invention to bridge this gap by proposing a new process and a new machine for automatically pulling off and loosening belly strips from a hog carcass, which has been scalded, eviscerated and is suspended in conventional manner by its hind legs to a moving conveyor means.

The object of the invention is to propose a new method and a new machine capable of pulling off and loosening belly strips, either in stationary or moving manner, by performing this operation simultaneously for the two sides of each supended hog.

Another object of the invention is to propose a pulling off and loosening technique whereby, if necessary, the belly strips can be detached completely from the hog's belly, or whereby they can be left attached by their upper parts to the internal faces of the hog's belly, as in the conventional manual method, so that they can go through the cooling step before being loosened off by severing in order to be directed towards a processing, preserving or actual transformation treatment.

Yet another object of the invention is to propose a method or a machine capable of performing such an operation while allowing for any morphological variations either in the strips of fat or in the hogs carrying them.

A final object of the invention is to propose a simple, strong and reliable machine which can be easily integrated to the current automatic mass-slaughtering installations.

These objects are reached according to the invention, with a process consisting in:

suspending an eviscerated hog carcass by its hind legs, introducing into the hog's open rib cage, a clamp equipped with inwardly-directed active jaws, placing said active jaws substantially inside the plane of the lower end portions of the belly strips lining the internal faces of the hog's sides, opening the clamp in order to place the active jaws against the lower end portions of the belly strips, pressing, against the external face of the hog's sides, passive counter-jaws, in facing relationship to said active jaws, bringing out of said active jaws, means for gripping the belly strips simultaneously, opening out the passive counter-jaws, closing the clamp so as to bring the active jaws close together and to pull off the lower end portions of the belly strips gripped by said gripping means, raising the clamp in order to loosen the belly strips from the internal faces of the hog's sides and, extracting the clamp from the hog.

The invention also relates to a machine for carrying out the aforesaid process, said machine being characterized in that it comprises:

a supporting structure which is movable vertically, by way of a motor, on support and guide rails mounted on a frame, a chassis supported by said structure, movable horizontally, by way of a motor, and forming a vertical pivot, and a two-branched clamp, mounted on said pivot, and comprising:

two jaws projecting with respect to the chassis and provided in their outer faces with retractable active grips or other gripping means, means for controlling the opening and closing of the branches of the clamp and the extension and retraction of the gripping means, two passive counter-jaws mounted for pivoting on the branches, substantially inside the horizontal plane of the active grips in order to be also situated externally thereof, and means for controlling the relative stroke of closing and opening of the counter-jaws with respect to the grips.

BRIEF DESCRIPTION OF THE DRAWINGS

The invention will be more readily understood on reading the following description with reference to the accompanying drawings, in which.

DETAILED DESCRIPTION OF THE INVENTION

Figure 1:
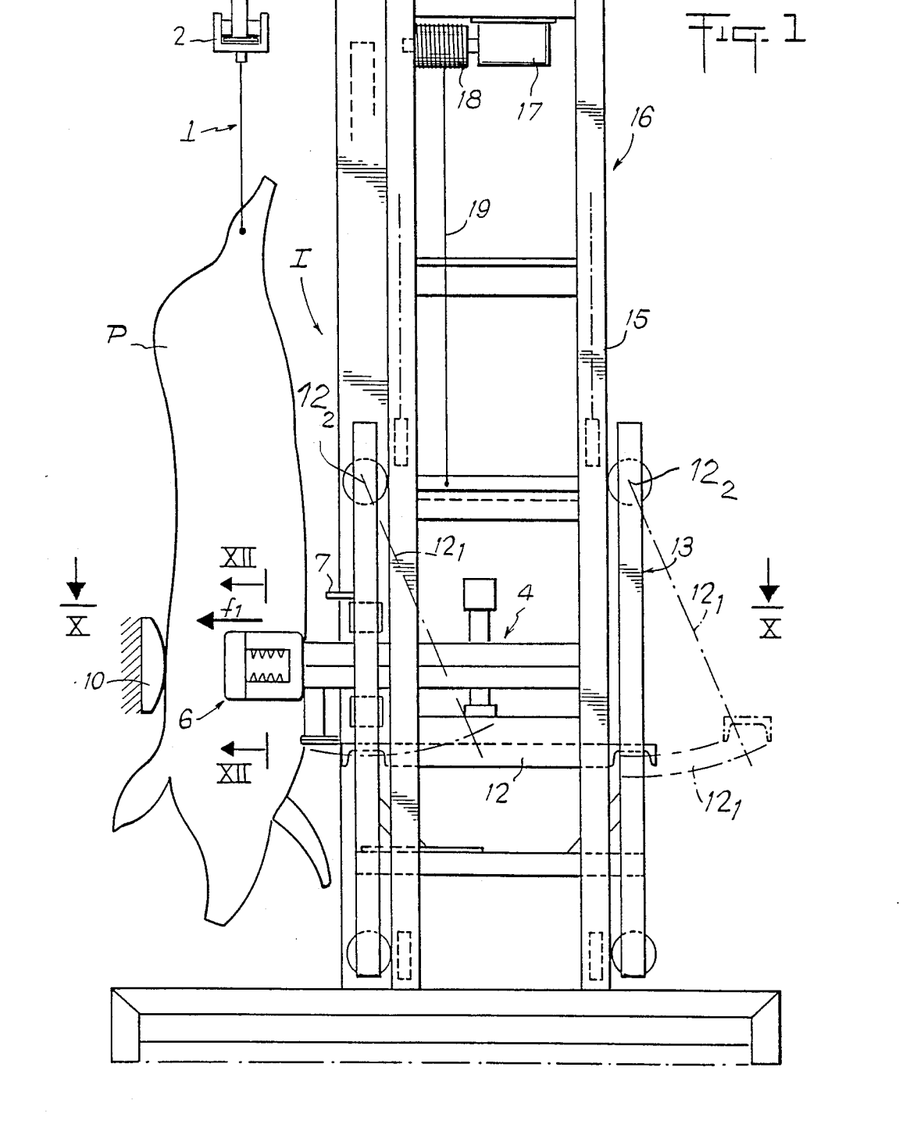
FIG. 1 is a diagrammatical side-elevational view illustrating the process and machine according to the invention.
Figure 2:
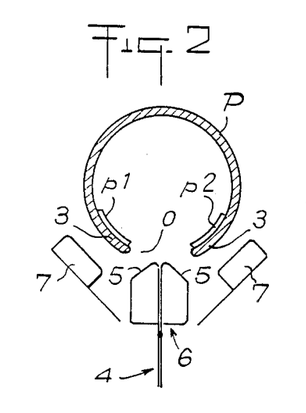
FIGS. 2 to 9 are diagrammatical views illustrating a number of specific steps in the process according to the invention.

Referring now to the figures, FIGS. 1 and 2 are meant to illustrate in what context the object of the invention is placed to overcome the problems arising in this technique.

As indicated hereinabove, the technical field concerned is that of the mass-slaughtering of hogs P, which hogs, after the actual slaughtering, are suspended by their hind legs and by means of a bar 1 to a conveyor 2 moving them continuously or stepwise to various attendance stations.

After the slaughtering, the hogs P are scalded, depilated, singed, brushed and eviscerated; for this, they are cut open along the abdominal face and along the rib cage, thus providing an access for extracting the viscera and the offals. After this operation, the hogs P are brought in succession by conveyor 2 outside a station I where the two belly strips, $p_1$ and $p_2$, which are fatty deposits lining the inner faces of the open sides of the hog carcass, are pulled off and loosened. Said belly strips $p_1$, $p_2$ generally extend from a low level corresponding substantially to the second front teat, over substantially half the belly.

The object of the invention is to perform the pulling off and loosening of the two belly strips, automatically, and no longer manually.

To this end, as illustrated in FIG. 2, the process according to the invention consists first in bringing in front of the thoraco-abdominal opening 0 of a hog P suspended by its hind legs, and eviscerated, a clamp 4 having two parallel jaws 5 shaped so as to form a penetrating head 6 capable of being introduced between the lips of said opening 0. Said clamp 4 is particular in that it comprises jaws 5, called jaws with active grip projecting from their opposite external side faces.

Figure 3:
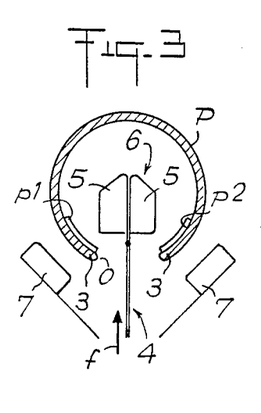

A second step in the process consists in introducing head 6 inside the hog as illustrated by arrow f in FIG. 3, and in bringing said head 6 substantially inside the horizontal plane of the lower end portions of the belly strips $p_1$, $p_2$, i.e. close to the two second front teats. Depending on the hog's morphology, this step may begin by introducing the head 6 from the upper end of opening 0, namely in the sub-abdominal region, or on the contrary, from the lower end corresponding to the rib cage. In the first case, the head 6 is introduced, and then, it is moved downward inside the hog carcass, until it reaches the above-mentioned reference horizontal plane. In the second case, head 6 is introduced at the lowest point of the thoracic opening 0, then it is moved upward until it reaches the same reference plane.

Head 6 is stopped in the required position automatically, taking for example the two front teats as reference, using a sensor 7 illustrated in FIG. 1.

Figure 4:
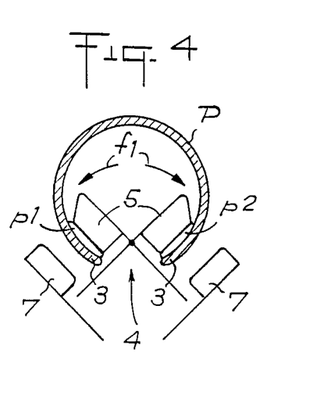

According to another step in the process, such as illustrated in FIG. 4, clamp 4 is controlled to open the jaws 5 which are drawn apart according to arrows $f_1$ inside the carcass, until they are applied against the lower end portions of the belly strips $p_1$ and $p_2$.

Figure 5:
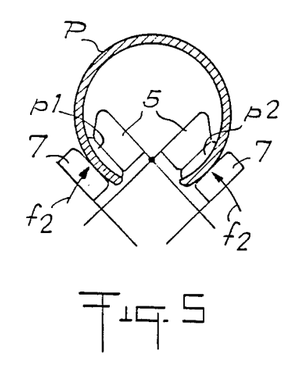

Another step then consists in bringing against the external face of the sides 3 of the hog carcass, counter-jaws 7 which are urged in the direction of arrows $f_2$, as illustrated in FIG. 5. Said counter-jaws 7 thus press the internal faces of the hog sides 3 and, more particularly, the belly strips $p_1$ and $p_2$, against the outer faces of jaws 5. Preferably, said counterjaws 7 act so as to incurve the hog sides 3 locally, causing them to penetrate partly inside the jaws.

Figure 6:
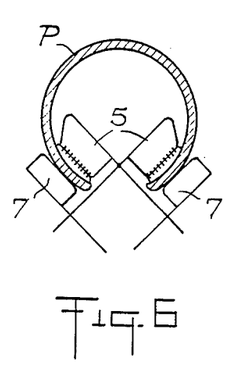

In another step of the process, illustrated in FIG. 6, the jaws 5 are controlled to grip, via active grips or other such means acting in the plane of their external face, the lower portions of the belly strips $p_1$ and $p_2$ and, more particularly, those parts of said strips which are pushed inside the external faces of the jaws 5 by counter-jaws 7.

When the active grips, or other such gripping means, of jaws 5 have gripped the belly strips $p_1$ and $p_2$, counter-jaws 7 are controlled to move out in the direction of arrows $f_3$ (FIG. 7), hence away from the external faces of the hog sides 3. This teps is accomplished by controlling clamp 4 in such a way as to move jaws 5 in the direction of arrow $f_4$, i.e. one close to the other, such as illustrated in FIG. 2. This step in the process is carried out without there being any relative displacement of the clamp 4 with respect to the hog carcass so that when jaws 5 move close together, this causes the pulling off of the end portions of the belly strips $p_1$ and $p_2$ from the internal faces of sides 3 of the hog's carcass.

Figure 8:
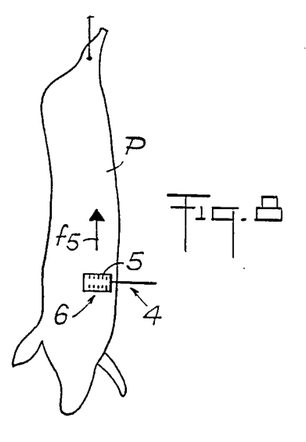
Figure 9:
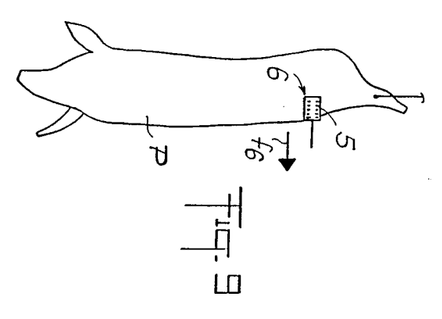

In a subsequent step of the process, clamp 4 is moved upwardly, according to arrow $f_5$ shown in FIG. 8. From the initial horizontal reference position, this upward movement consequently causes the progressive loosening of the belly strips pulled by the jaws 5 gripping their lower end portions. Belly strips $p_1$ and $p_2$ are thus progressively loosened until jaws 5 reach a maximum elevation position, such as illustrated in FIG. 9.

This position can be that which causes the complete loosening of the belly strips which, in this case, are extracted from the hog P by retraction of the head 6 according to arrow $f_6$. But, in one step of the process, which is generally more practically applied, said maximum elevation position corresponds to a pulling off-loosening over most of the length of the belly strips which, however remain attached by their upper end portion. In this position, the last step in the process then consists in releasing the belly strips by controlling the gripping means in reverse, and by moving clamp 4 in the direction of arrow $f_6$, in order to bring head 6 out of the hog's carcass. The hog can then be moved towards other attendance stations up to the cooling station, after what the cooled belly strips $p_1$ and $p_2$ will be severed.

The various above-mentioned steps may be carried out in succession, in stationary manner, i.e. when the hog P is brought and immobilized outside station I, or in movable manner, when the hog P is moved continuously forward. In such a case, the various movements imparted to clamp 4 are combined with a concomitant translation at the same speed and in the same direction as the movement imparted to hog P by the conveyor 2.

In both cases, the step of introducing the penetrating head 6 from the base of the thoracic opening 0, is conducted, preferably, while the hog P is resting against a back support 10 such as a horizontal rail. Said support 10 constitutes an abutment against any oscillation or movement of the hog P when head 6 is introduced in the direction of arrow f, such as described with reference to FIG. 3.

The process according to the invention therefore calls on the use of a machine in the form of a clamp with two openable jaws, these jaws being characterized in that they are equipped with gripping means adapted to be retracted with respect to the open external faces and to be controlled in projection with respect to said external faces, for gripping the lower end portions of the belly strips $p_1$ and $p_2$. Said machine is also characterized by the use of counter-jaws which can exert on the external face of the hog sides 3, a punctual pressure which will cause said sides to curve inwardly, thus making it easy for the active grips or other gripping means controlled in a working stroke, to grip the belly strips.

Various embodiments of clamp 4 are suitable for performing the aforesaid functions. For example, very good results have been obtained with jaws 5 designed so that they have active grips in the form of movable claws.

Figure 10:
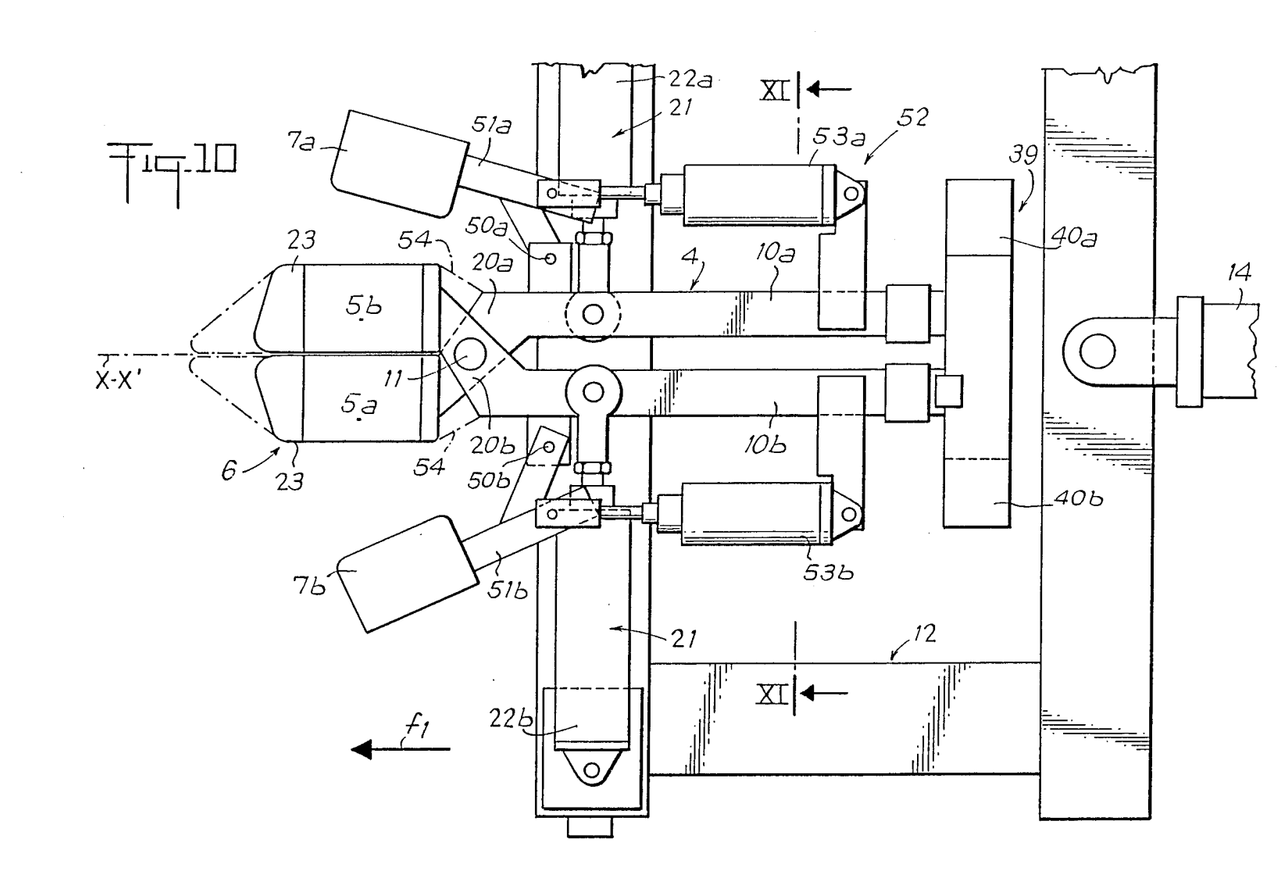
FIG. 10 is a plan view, taken on a larger scale, along line X—X of FIG. 1.
Figure 11:
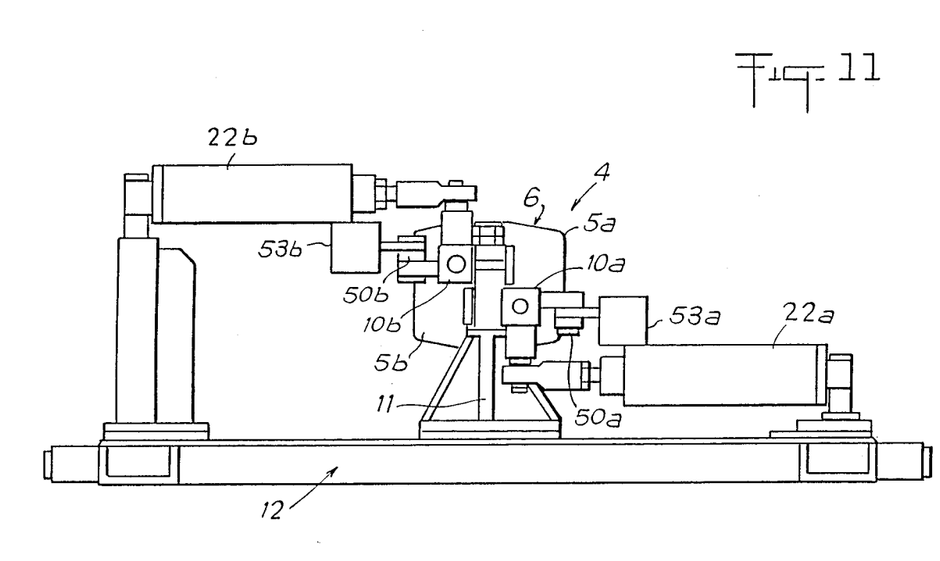
FIG. 11 is a side view taken along line XI—XI of FIG. 10.

FIGS. 10 and 11 illustrate, by way of example, and with reference to FIG. 1, a preferred embodiment of clamp 4, whereby said clamp is principally constituted by two branches 10a and 10b. Both branches are articulated on a vertical pivot 11 supported by a chassis 12 mounted on a supporting structure 13. Chassis 12 can be moved relatively by a suitable driving member 14, in the direction of arrow $f_1$, from the rest position illustrated in FIGS. 1 and 10. Said driving member 14 can be constituted by a jack which imparts a purely linear movement to the chassis 12, and be mounted on rails fitted in the corresponding direction on structure 13. As shown in FIG. 1, the connection between chassis 12 and structure 13 can be such that the movement in the direction of arrow $f_1$ is pendulum fashion. In this case, chassis 12 is suspended to two deformable parallelograms $12_1$, articulated on spindles $12_2$ borne by the structure 13.

The supporting structure 13 is mounted for moving vertically on guide rails 15 formed by a frame 16 which extends in parallel to a conveyor 2 while being integrated to a mass-slaughtering installation structure. Supporting structure 13 is vertically movable up and down, via a driving member 17 which includes, for example, a drum 18 for winding-unwinding a suspending cable 19 or the like fastened to the upper part of structure 13. The vertical movement imparted to structure 13 can be active upwardly, and passive downwardly. But obviously an active movement can occur in the both directions and other means than those indicated hereinabove by way of example, can be used.

Branches 10a and 10b can be placed inside the same horizontal plane or, on the contrary, they can be relatively offset, as illustrated in FIG. 11. Branches 10a and 10b are mounted on pivot 11 in cissors fashion and are provided to this end with criss-crossing set-in portions 20a and 20b for supporting respectively, jaws 5a and 5b which are thus projecting out from chassis 12 and extend beyond pivot 11. Branches 10a and 10b are operationally coupled to means 21 for controlling the opening and closing of jaw 5a and 5b. Said means 21 are for example constituted by jacks 22a and 22b carried by chassis 12. Obviously, other types of driving or actuating means can be used and, in some cases, only one means can be used for controlling both the opening and closing the two branches 10a and 10b.

Jaws 5a and 5b with working grips are symmetrical with respect to a vertical plane x-x' separating the jaws in side-by-side position. For this reason, only one jaw is described hereinafter with reference to FIGS. 12 to 16.

Figures 12, 15:
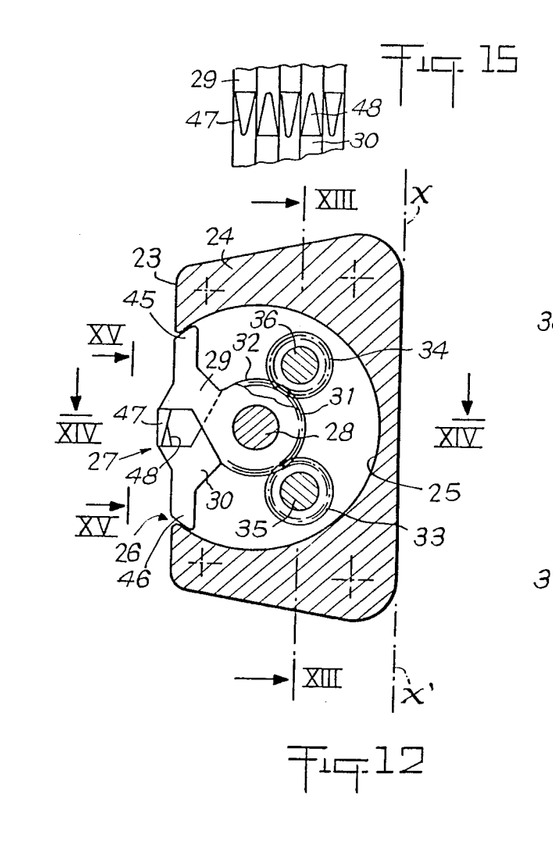
FIG. 12 is a cross-section, on a larger scale, along line XII—XII of FIG. 1.
FIGS. 13 to 15 are partial elevations, partly in cross-section, taken along lines XIII—XIII to XV—XV of FIG. 12.
Figure 13:
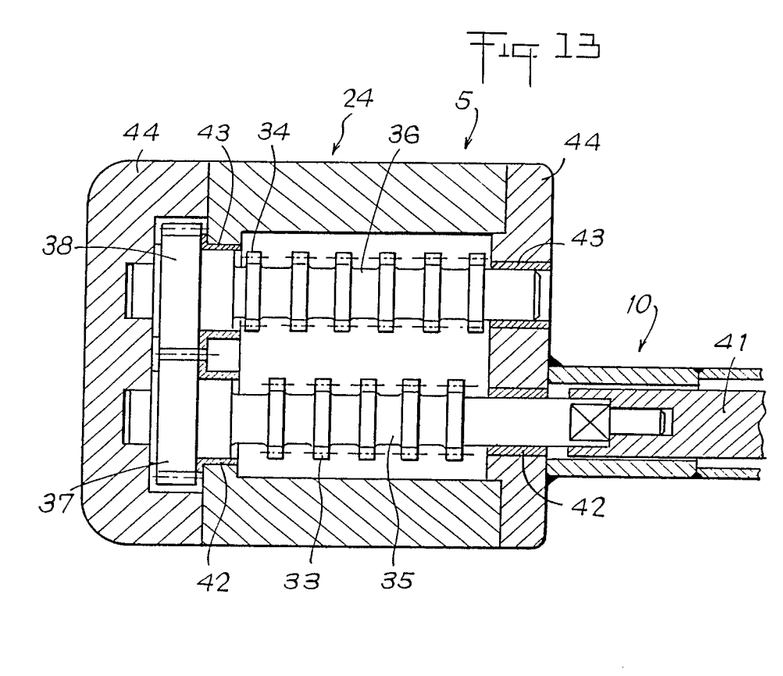
Figure 14:
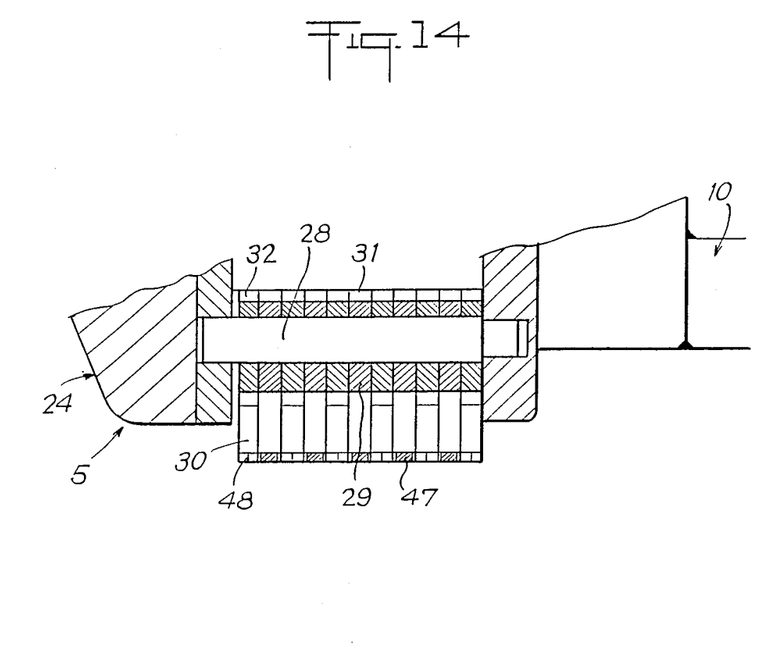

Each jaw 5 comprises a body or casing 24 which defines on the inside a cylindrical housing 25 opening outwardly in the plane of the outer face 23 by a window 26 of rectangular shape. Said housing 25 contains active grips or other gripping means 27 which are fully retractable inside housing 25 or project partly out of window 26, as illustrated in FIG. 12. According to one particular embodiment, the gripping means or active grips 27 comprise, mounted on a fixed spindle 28 supported by casing 24, two sets of intercalated claws 29 and 30. Each claw 29 and 30 comprises a toothed sector 31, 32 in constant mesh with a complementary pinion 33, 34, formed or mounted, for set of claws 29, on a driving shaft 35 and, for set of claws 30, on a driven shaft 36. For example, driven shaft 35 can be meshing via pinions 37 and 38 with driven shaft 36. In any case, the means used for driving shafts 35 and 36 in rotation are selected so that said shafts are subjected to partial angular rotations which are synchronous and reversed. Driving shaft 35 receives its rotating movement from means 39 controlling the retraction or extension of claws 29, 30. In the example illustrated in FIG. 10, said means 39 are constituted by two motors 40a and 40b carried by branches 10a and 10b, each one actuating an extension bar 41 extending inside the corresponding branch 10 for directly driving said driving shaft 35.

Shafts 35 and 36 are mounted in bearings 42 and 43, for example of the plain bearing ring type adapted in end-plates 44 constituting the casing 24.

Figure 16:
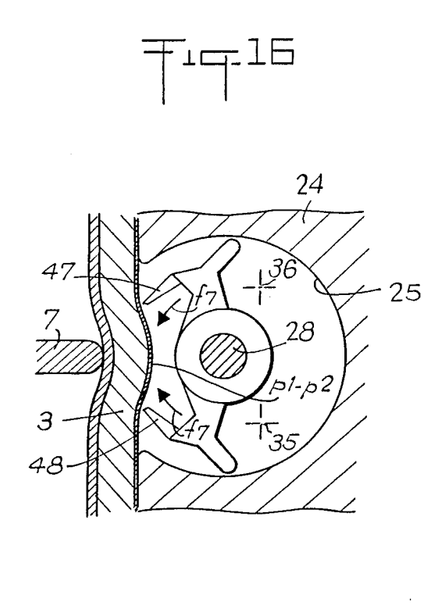
FIG. 16 is a similar view to FIG. 12, illustrating another characteristic position of operation of the same member.

As illustrated in FIGS. 12, 15 and 16, each claw 29 or 30 forms a substantially radial extension, extended by a heel piece 45 or 46 which cooperates by surface contact, with the cylindrical housing 25, and by a tooth 47, 48. Teeth 47, 48 are adapted to interlock one with the other in the position of extension outside the plane of window 26 such as illustrated in FIG. 12, or to be relatively apart in the retracted position inside housing 25, as illustrated in FIG. 16.

In the steps illustrated in FIGS. 3, 4 and 5 of the above-described process, driving members 40a and 40b control the retraction of the gripping members so that claws 29 and 30 occupy the position shown in FIG. 16. In the step of the process illustrated in FIG. 5, the counter jaws 7 are applied against the external face of the hog sides 3 which are thus pressed against outer faces 23 of jaws 5. In this position, driving members 40a and 40b are controlled to urge the pivoting movement of claws 29 and 30 in the direction of arrows $f_7$, causing the teeth 47 and 48 to penetrate into the fatty deposit constituting the belly strips $p_1$ and $p_2$ which are thus gripped, on the one hand by rotary penetration of teeth 47 and 48 inside said strips and, on the other hand, by wedging as a result of the interpenetration of said teeth, as shown in FIG. 15. The belly strips are thus caught and gripped firmly in order to be, first, pulled off the inner face of the hog sides 3 which they line, when jaws 5a and 5b are controlled into a closing stroke according to arrows $f_4$ in FIG. 7.

FIGS. 10 and 11 show that branches 10a and 10b also support, via pivot pins 50a and 50b, lever arms 51a and 51b, on the ends of which are fixed the counter-jaws 7a and 7b, the axial position of which is adjustable at discretion. Said counter-jaws are constituted by rigid plates of small thickness, of length generally less than the corresponding measurement of windows 26. Said counter-jaws 7a, 7b extend substantially in the same horizontal plane corresponding approximately to a plane traversing the axles 28 of the jaws. Lever arms 51a and 51b are joined to means 52 for controlling the relative opening and closing thereof with respect to jaws 5a and 5b. Said means 52 can be constituted by two jacks 53a and 53b carried by branches 10a and 10b, and acting selectively on lever arms 51a and 51b. It should however be noted that jacks 53a and 53b could also be replaced by other actuating means, and even by a single actuator, which would act on the two lever arms 51a and 51b simultaneously.

FIG. 10 shows that, in some cases, jaws 5a and 5b may be designed to comprise casings 24 shaped so as to define together, as illustrated in dot-and-dash line, when they are in closed position side by side, a sort of penetrating wedge-shaped head 6 permitting the separation of the lips defining the thoraco-abdominal opening 0. This particular design is obtained principally by machining of the front end-plates 44. According to FIG. 10, the rear end-plates can be produced so as to comprise ramps 54 which help the release in the direction of arrow $f_6$, by progressive opening of the lips defining the thoraco-abdominal opening 0.

Figure 17:
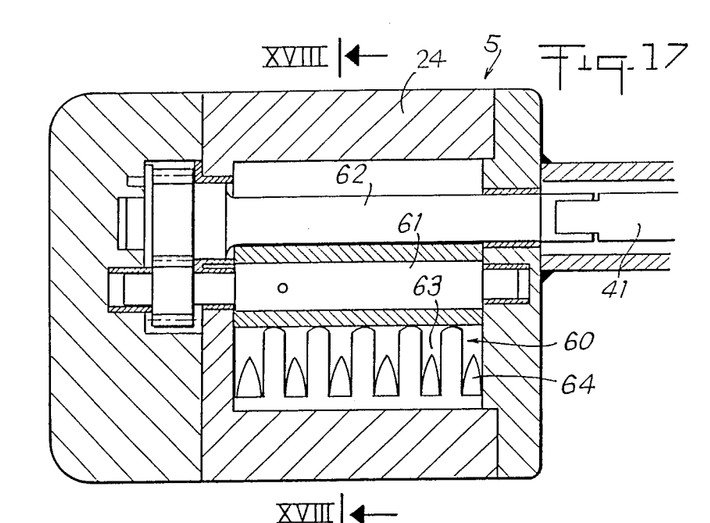
FIG. 17 is an elevationsl cross-section similar to FIG. 13, illustrating a variant embodiment.
Figure 18:
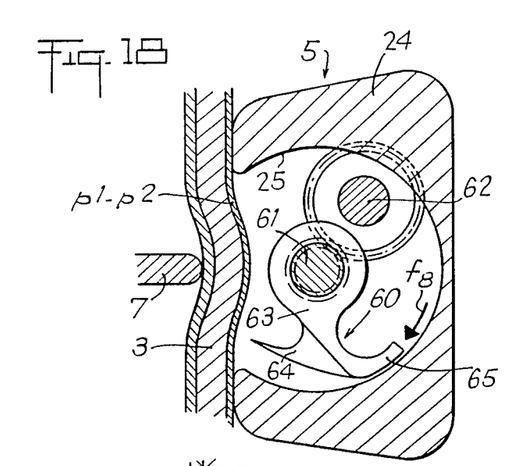
FIG. 18 is a cross-section along line XVIII—XVIII of FIG. 17.
Figure 19:
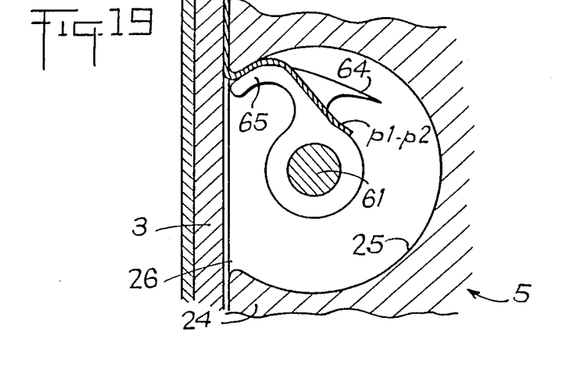
FIG. 19 is a cross-section corresponding to FIG. 18 and illustrating another characteristic position of some of the elements constituting the member of the machine.

FIGS. 17 to 19 illustrate a variant embodiment, whereby the active grip or other gripping means of each jaw 5 comprises only one series of claws 60 wedged axially at an angle on a shaft 61 driven in rotation by a shaft 62 controlled by extension bar 41. In this particular embodiment, each one of claws 60 comprises a radial extension 63 forming a sharp tooth 64 which extends on the opposite side of a heel piece 65. In the retracted position, the set of claws 60 occupies a low position inside housing 25, the various sharp teeth 64 facing, in upwardly inclined manner, in the direction of window 26.

Driving members 40a and 40b are controlled to cause the pivoting movement of the set of claws 60, in the direction of arrow $f_8$, during the belly strips gripping step, such as illustrated in FIG. 6. Teeth 64 are thus made to penetrate from the base upward into the lower end portions of belly strips $p_1$, $p_2$, in order to progressively initiate pulling off thereof, as well as partial turning over inside housings 25. Thus, as illustrated in FIG. 19, heels 65 squeeze the belly strips $p_1$, $p_2$ against the cylindrical peripheral wall of housings 25 and in doing so contribute, in combination with the penetrating movement of teeth 64, to firmly gripping the lower end portions of said belly strips $p_1$ and $p_2$, thereby ensuring an efficient pulling off of said belly strips during the closing stroke of jaws 5 according to arrow $f_4$ in FIG. 7.

Figures 20, 21, 22:
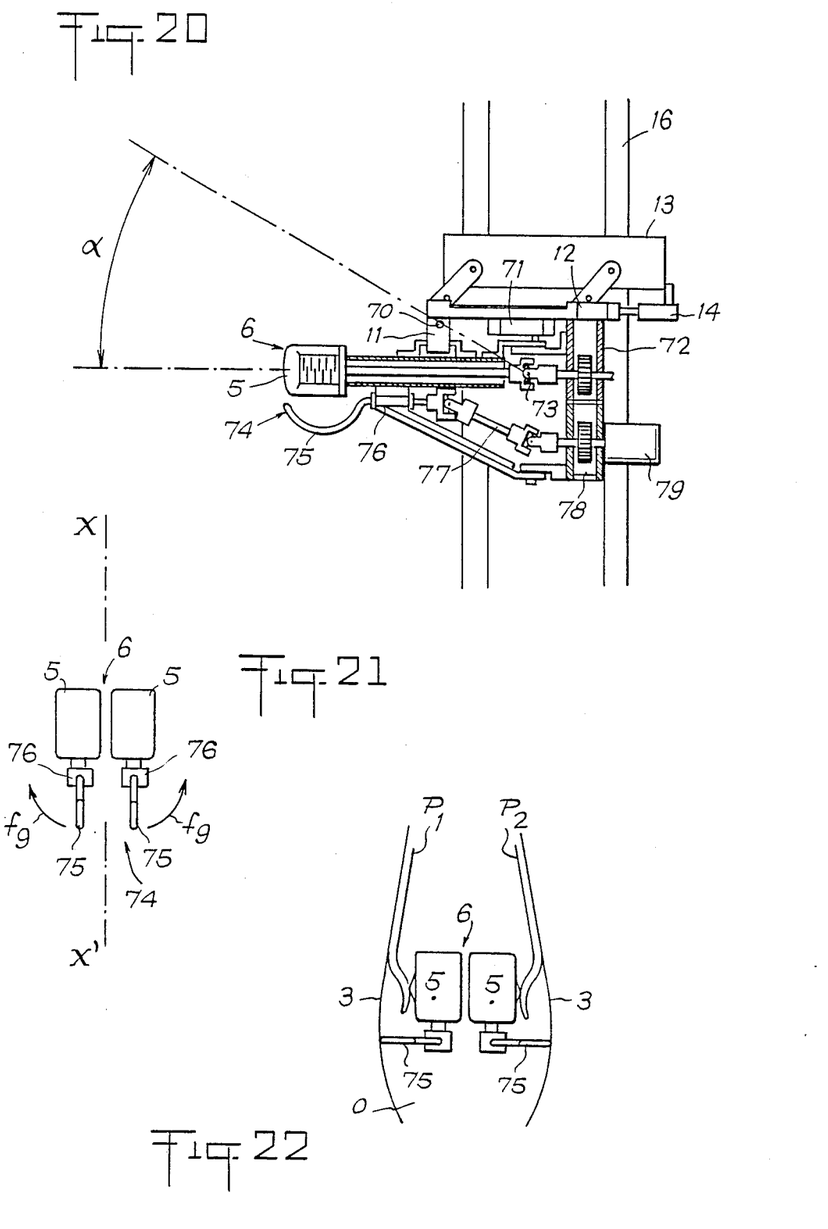
FIG. 20 is a diagrammatical side view showing a variant embodiment of the machine.
FIGS. 21 and 22 are diagrams showing two particular steps in the operation of the machine according to FIG. 20.

In the variant illustrated in FIG. 20, the machine is designed so that clamp 4 is suspended to pivot 11 which extends from the lower face of the superposed chassis 12. According to this embodiment, it is possible to have a pivot 11 articulated on a horizontal spindle 70 carried by the chassis. In such a case, pivot 11 is then connected to actuating means 71 fixed on the chassis.

It becomes possible, then, by controlling said actuating means 71, to pivot the clamp 4 on the horizontal spindle and to incline it upwardly of an angle $\alpha$ when head 6 is introduced in opening 0. Said angle $\alpha$ can be between 0° and 45°. Said angle $\alpha$ permits an easier penetration of the head 6 and the gripping of the belly strips $p_1$ and $p_2$. After such gripping and optional pulling off, clamp 4 is returned to the horizontal position before being moved according to arrow $f_8$ (FIG. 8), to perform the loosening of the belly strips.

In such a case, driving of the extension bars 41 can be controlled from a reduction-gear box 72 with cardan and spline shaft sections 73.

According to the variant illustrated in FIG. 20, the fact of suspending the machine to the articulated pivot 11 further permits the mounting of a rotary expander 74 under each jaw 5. Each expander 74 is in the form of a bow 75 extending in cantilevered fashion from a bearing 76 suspended to the corresponding branch 10. Said bow 75 is coupled to a shaft 77 imparted with alternated partial angular rotating movements from a reduction-gear box 78 adapted on the output shaft of a motor 79. In the case where an articulated pivot 11 is used, shaft 77 is preferably a cardan and spline shaft.

Normally, each bow occupies a rest position such as illustrated in FIG. 21. In this position, the bows extend in parallel to and on either side of the plane x-x'. The expanders work as explained hereunder with reference to the steps illustrated in FIGS. 6 and 7.

Figure 7:
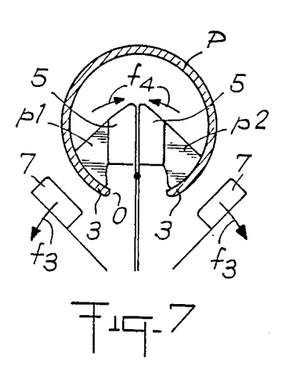

FIG. 6 corresponds, as indicated hereinabove, to the gripping of the lower end portions of the belly strips $p_1$ and $p_2$ by the opened out jaws 5. Counter-jaws 7 are then controlled open, and branches 10 are closed in order to indicate the belly strips pulling off step, as illustrated in FIG. 7. In this step, and simultaneously to the closing of branches 10, the expanders are actuated to control the rotation of the bows in the direction of arrows $f_9$, so that these are brought to rest against the inner faces of the hog sides 3. As illustrated in FIG. 22, the closing of branches 10 and opening out of hog sides 3 by bows 75 make it easier to pull off belly strips p₁ and p₂ which are thereafter loosened by subjecting clamp 5 to a rising movement during which the expanders 74 can be either kept open, or returned to the closed position, as illustrated in FIG. 21.

It is obvious, from the foregoing description, that the machine according to the invention is structurally simple, strong and reliable and that it can work for long periods in the difficult conditions that prevail in a slaughter-house. Said machine is designed for carrying out the process according to the invention which consists in the simultaneous pulling off and loosening of two hog belly strips, whatever the morphological characteristics of the hog.

Obviously the invention is not in any way limited to the description given hereinabove, and on the contrary covers any modifications that can be brought thereto without departing from its scope.

What is claimed is:

1. Machine for pulling off the belly strips from a hog carcass, wherein said machine comprises:
   means for suspending an eviscerated hog carcass by its hind legs,
   means for introducing, in the hog's open rib cage, a clamp equipped with inwardly-directed active jaws,
   means for placing the active jaws substantially inside the plane of the lower end portions of the belly strips lining the internal faces of the hog's sides,
   means for opening the clamp in order to place the active jaws against the lower end portions of the belly strips,
   means for pressing, against the external face of the hog's sides, passive counter-jaws, in facing relationship to said active jaws,
   means for bringing out of said active jaws, means for gripping the belly strips simultaneously,
   means for opening out the passive counter-jaws,
   means for closing the clamp so as to bring the active jaws close together and to pull off the lower end portions of the belly strips gripped by said gripping means,
   means for raising the clamp in order to loosen the belly strips from the internal faces of the hog's sides, and
   means for extracting the clamp from the hog.

2. Machine as claimed in claim 1, wherein said machine comprises:
   means for raising the clamp over a height smaller than the length of the belly strips in order to leave the latter attached by their upper portion to the internal faces of the hog's sides,
   means for retracting the gripping means in the active jaws for releasing said belly strips,
   means for lowering the clamp and bringing it out of the hog.

3. Machine as claimed in claim 1, wherein said machine comprises a clamp, introduced by the top part of the suspended hog and lowered down until the active grips or jaws are brought in the plane of the lower end portions of the belly strips.

4. Machine as claimed in claim 1, wherein said machine comprises a clamp which is introduced by the bottom part of the hog which is immobilized in position against a back rest, said clamp being placed in the plane of the lower end portions of the belly strips.

5. Machine as claimed in claim 1, wherein the clamp is introduced into a hog suspended at a fixed station.

6. Machine as claimed in claim 1, wherein the clamp is introduced into the hog and is then imparted with a movement of translation of same direction and speed as the foward continuous movement imparted to the suspended hog.

7. Machine as claimed in claim 5, wherein the clamp is introduced into the hog in such a way that the active grips are inclined upwardly.

8. Machine as claimed in claim 1, wherein the clamp is closed in order to bring the active grips close together then it is open at the same time as expanders carried by the clamp and resting on the internal faces of the hog's side.

9. Machine for pulling off the belly strips from a suspended hog carcass, wherein said machine comprises:
   a supporting structure which is vertically movable by means of a motor, over supporting and guide rails mounted on a frame,
   a chassis carried by said structure, which is horizontally movable by means of a motor and forms a vertical pivot, and
   a two-branched clamp mounted on said pivot and comprising:
       two jaws projecting with respect to the chassis and being equipped on their external faces with retractable active grips or other gripping means,
       means for controlling the opening and closing of the branches of the clamp and for extending or retracting said gripping means,
       two passive counter-jaws mounted for pivoting on the branches of the clamp, substantially inside the horizontal plane of said active grips, so as to be also situated outside the latter,
       and means for controlling the relative opening and closing of the counter-jaws with respect to the grips.

10. Machine as claimed in claim 9, wherein the jaws are produced in the form of two complementary casings defining cylindrical housings, secant with the substantially vertical external faces and containing the gripping means.

11. Machine as claimed in claim 10, wherein the gripping means are constituted by sets of rotary claws capable of being retracted inside the housings or brought out therefrom for gripping the belly strips.

12. Machine as claimed in claim 11, wherein the gripping means are constituted for each casing by two sets of claws operationally coupled for rotating synchronously in reverse, said claws criss-crossing and interlocking in a relative closure position in which they grip the belly strips.

13. Machine as claimed in claim 11, wherein the gripping means are constituted by only one set of rotary claws formed by sharp teeth extending from a gripping heel which cooperates with the axi-symmetrical inner face of the housing, from the open outer face of the casing in order to grip the pulled off belly strip.

14. Machine as claimed in claim 10, wherein the gripping means are driven in rotation on their opening-closing stroke and reverse, by means which are separate for each branch of the clamp.

15. Machine as claimed in claim 10, wherein the casings are so shaped as to define together, in the closed position of the clamp, a substantially wedge-shaped head having a vertical plane of symmetry.

16. Machine as claimed in claim 9, wherein the means for opening and closing the counter-jaws are carried by the branches.

17. Machine as claimed in claim 9, wherein the supporting structure is operationally coupled to means for detecting the bottom part of the belly strips.

18. Machine as claimed in claim 9, wherein the clamp is mounted on a pivot suspended by a horizontal articulation spindle to a superposed chassis on which rests an actuator controlling the pivot.

19. Machine as claimed in claim 9, wherein the clamp is equipped, for each jaw, with an expander constituted by a bow extending in parallel to the plane of symmetry of the head and under the corresponding jaw, while being supported by a rotation bearing, said bow being coupled to means for imparting it with alternate partial angular rotary movements.

* * * * *